(12) United States Patent
Chen

(10) Patent No.: US 9,606,545 B1
(45) Date of Patent: Mar. 28, 2017

(54) SELF-PROPELLED APPARATUS WITH AN ANTI-DROP SYSTEM

(71) Applicant: Lumiplus Technology (Suzhou) Co., Ltd., Taicang (CN)

(72) Inventor: Shun-Yi Chen, Taipei (TW)

(73) Assignee: LUMIPLUS TECHNOLOGY (SUZHOU) CO., LTD., Taicang (CN)

( * ) Notice: Subject to any disclaimer, the term of this patent is extended or adjusted under 35 U.S.C. 154(b) by 0 days.

(21) Appl. No.: 15/063,840

(22) Filed: Mar. 8, 2016

(30) Foreign Application Priority Data

Oct. 13, 2015 (TW) .............................. 104216377 U

(51) Int. Cl.
| | |
|---|---|
| *G01S 13/93* | (2006.01) |
| *G05D 1/08* | (2006.01) |
| *A47L 9/00* | (2006.01) |
| *A47L 9/28* | (2006.01) |
| *G05D 1/02* | (2006.01) |
| *B60K 31/00* | (2006.01) |

(52) U.S. Cl.
CPC ............ *G05D 1/0891* (2013.01); *A47L 9/009* (2013.01); *A47L 9/2852* (2013.01); *A47L 2201/04* (2013.01); *B60K 2031/0016* (2013.01); *G01S 13/931* (2013.01); *G05D 1/0242* (2013.01)

(58) Field of Classification Search
CPC .... A47L 9/009; G05D 1/0891; G05D 1/0242; B60K 31/0008; B60K 31/0016; G01S 13/931; G01S 2013/9342; G01S 2013/9346; G01S 2013/9364
See application file for complete search history.

(56) References Cited

U.S. PATENT DOCUMENTS

| | | | | |
|---|---|---|---|---|
| 3,749,197 | A * | 7/1973 | Deutsch ............. | B60K 31/0008 180/169 |
| 4,309,758 | A * | 1/1982 | Halsall ................. | G05D 1/0234 180/169 |
| 4,328,545 | A * | 5/1982 | Halsall ...................... | G01S 5/16 180/167 |
| 4,632,543 | A * | 12/1986 | Endo ................... | B60K 31/0008 180/167 |
| 4,815,008 | A * | 3/1989 | Kadonoff ............. | G05D 1/0234 180/169 |
| 5,440,216 | A * | 8/1995 | Kim ......................... | A47L 5/28 15/319 |

(Continued)

*Primary Examiner* — Erez Gurari
(74) *Attorney, Agent, or Firm* — WPAT, PC; Justin King

(57) ABSTRACT

A self-propelled apparatus includes a main body and an anti-drop system. The main body includes an aperture located at a bottom portion thereof and communicative with an interior thereof. The anti-drop system located inside the main body respective to the aperture includes an infrared detection module and an angle-limiting unit electrically coupled with the infrared detection module. The infrared detection module detects a distance between the bottom portion and a first detection surface. The infrared detection module includes an infrared emitting unit and an infrared receiving unit. The infrared emitting unit emits an infrared signal to the first detection surface. The infrared signal produces a first boundary signal and a second boundary signal after the infrared signal passes through the angle-limiting unit. The infrared receiving unit receives a reflected signal of the first boundary signal with respect to the first detection surface.

7 Claims, 3 Drawing Sheets

(56) References Cited

U.S. PATENT DOCUMENTS

| | | | | |
|---|---|---|---|---|
| 5,529,138 A * | 6/1996 | Shaw | ............... | B60K 23/08 |
| | | | | 180/169 |
| 5,745,070 A * | 4/1998 | Yamada | ............ | G01S 13/931 |
| | | | | 340/435 |
| 6,026,353 A * | 2/2000 | Winner | ............ | G01S 7/4026 |
| | | | | 342/70 |
| 6,073,078 A * | 6/2000 | Kitahara | ............ | G01S 7/03 |
| | | | | 342/179 |
| 2004/0088080 A1* | 5/2004 | Song | ............ | A47L 9/009 |
| | | | | 700/259 |
| 2010/0286825 A1* | 11/2010 | Rew | ............ | A47L 9/009 |
| | | | | 700/253 |
| 2014/0150820 A1* | 6/2014 | Yoo | ............ | A47L 9/009 |
| | | | | 134/6 |
| 2014/0223675 A1* | 8/2014 | Klussendorff | ...... | A47L 11/4011 |
| | | | | 15/49.1 |
| 2014/0247180 A1* | 9/2014 | Moriuchi | ............ | G01S 7/41 |
| | | | | 342/70 |
| 2015/0000068 A1* | 1/2015 | Tsuboi | ............ | A47L 9/009 |
| | | | | 15/319 |
| 2015/0289740 A1* | 10/2015 | Yan | ............ | G05D 1/0022 |
| | | | | 701/2 |
| 2016/0309974 A1* | 10/2016 | Abe | ............ | A47L 9/28 |
| 2016/0324386 A1* | 11/2016 | Abe | ............ | G05D 1/0225 |

* cited by examiner

SELF-PROPELLED APPARATUS WITH AN ANTI-DROP SYSTEM

This application claims the benefit of Taiwan Patent Application Serial No. 104216377, filed Oct. 13, 2015, the subject matter of which is incorporated herein by reference.

BACKGROUND OF INVENTION

1. Field of the Invention

The invention relates to a self-propelled apparatus, and more particularly to the self-propelled apparatus that is equipped with an anti-drop system.

2. Description of the Prior Art

In domestic services, the self-propelled apparatus for indoor cleaning, also called as a cleaning robot, is itself a cleaning tool that needs no human involvement for a cleaning task, can perform the cleaning task automatically, and can suck in dusts and dirt while in waddling around the floor.

While the self-propelled apparatus moves on the floor, the route is usually preset in the apparatus, or the route is determined by applying an image-recognition means to judge the moving direction, the speed and the distance. However, since various indoor decorations and furniture may exist to different places from time to time, a preset fix scheme for the cleaning robot to follow is far from reality. In the case that the self-propelled apparatus may drop to be dysfunctional at a lower surface or more seriously may drop from a height, then the self-propelled apparatus might be damaged to an unworkable state.

In the art, a system with a set of sensors is implemented to protect the self-propelled apparatus from obstacles and/or dropping. Such a system is usually simply structured and less costly, but, in order to serve the detection purpose, the sensors are inevitably mounted to a front side of the main body of the self-propelled apparatus. Thus, some dropping risk may not be instinctively waived, and so unexpected dropping for the self-propelled apparatus is still possible.

In the art, to prevent the self-propelled apparatus from dropping from a height, an optical emitter and an optical receiver are introduced to be mounted obliquely inside the main body of the apparatus for detecting the distance between the infrared ray and the floor. In the case that a sum of the travelling distance of the emitting path and that of the receiving path changes, then it can be realized that the distance between the infrared ray and the floor is changed as well. Under such a circumstance, the self-propelled apparatus would be informed to turn, such that possible drop-from-height to the self-propelled apparatus can be avoided. When the receiving region and the emitting region do not have any overlapping, it implies that the distance between the self-propelled apparatus and the detection surface is too far, and thus a situation of meeting an obstacle is determined. To respond this situation, the self-propelled apparatus is turned or back off so as to avoid a possible damage from dropping-from-height. However, the design of obliquely mounting the optical elements includes complicated structuring and difficulty in disassembling and replacement. Hence, in the art, a lens module is introduced to deflect the lights emitted by the optical emitter.

As described above, it is obvious that all these prior arts would encounter a technical necking in detection distance and/or range. When the detection exceeds a predetermined range, then a problem in detection sensitivity would be inevitable. Further, if the power of the infrared emitter is lowered, then an inaccurate distance judgment would rise, even though the detection distance to the floor might be successfully shortened.

SUMMARY OF THE INVENTION

Accordingly, it is the primary object of the present invention to provide a self-propelled apparatus with an anti-drop system, that can limit the infrared signal in a specific signal-emitting region so as to precisely locate a floor with a height drop and thus to enhance the ability of anti-dropping to the self-propelled apparatus.

In this present invention, the self-propelled apparatus with an anti-drop system includes a main body and an anti-drop system. The main body includes an aperture and at least one driving wheel located at a bottom portion of the main body. The aperture is located also to the bottom portion and communicative with an interior of the main body. The anti-drop system located inside the main body at a place respective to the aperture includes an infrared detection module and an angle-limiting unit electrically coupled with the infrared detection module. The infrared detection module is to detect a distance between the bottom portion of the main body and a first detection surface. The infrared detection module includes an infrared emitting unit and an infrared receiving unit. The infrared emitting unit is to emit an infrared signal to the first detection surface. The infrared signal produces a first boundary signal and a second boundary signal after the infrared signal passes through the angle-limiting unit. An angle is formed by the first boundary signal and the second boundary signal. The infrared receiving unit is to receive an infrared receiving signal that is the reflected signal of the first boundary signal by the first detection surface.

In one embodiment of the present invention, the angle-limiting unit further has a first side, a second side opposing to the first side, and a protrusive portion, one end of the infrared emitting unit being located at the first side, another end of the infrared receiving unit being located at the second side, the protrusive portion being located at the first side, the infrared signal emitted by the infrared emitting unit being to pass through the protrusive portion and then to reach the first detection surface.

In one embodiment of the present invention, the angle-limiting unit is a lens module.

In one embodiment of the present invention, the anti-drop system further includes a fixation frame for fixing the infrared detection module.

In one embodiment of the present invention, the anti-drop system further includes a circuit board electrically coupled with the infrared detection module.

In one embodiment of the present invention, the first boundary signal is to irradiate the first detection surface, and the infrared receiving unit is to receive the second boundary signal.

In one embodiment of the present invention, the infrared detection module is further to detect a distance between a front end of the main body and a second detection surface, and the main body is stopped or slowed down when the distance between the front end of the main body and the second detection surface is less or equal to another distance defined by an anti-collision region.

Thus, in the self-propelled apparatus with an anti-drop system provided by the present invention, when the infrared signal passes through the angle-limiting unit, the angle-limiting unit would limit the angle of the infrared signal so as to have the infrared signal to have the first boundary signal and the second boundary signal. An angle is formed between the first boundary signal and the second boundary signal. The infrared receiving unit is to receive the infrared receiving signal that is the reflected signal of the first boundary signal by the first detection surface. Upon such an arrangement, the specific signal region defined by the first boundary signal and the second boundary signal can be formed by the angle-limiting unit, and thus a height-drop floor can be determined accurately within the specific height. Since the height-drop floor can be precisely detected, then the performance of the anti-drop system for the self-propelled apparatus can be substantially enhanced.

All these objects are achieved by the self-propelled apparatus with an anti-drop system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a self-propelled apparatus with an anti-drop system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
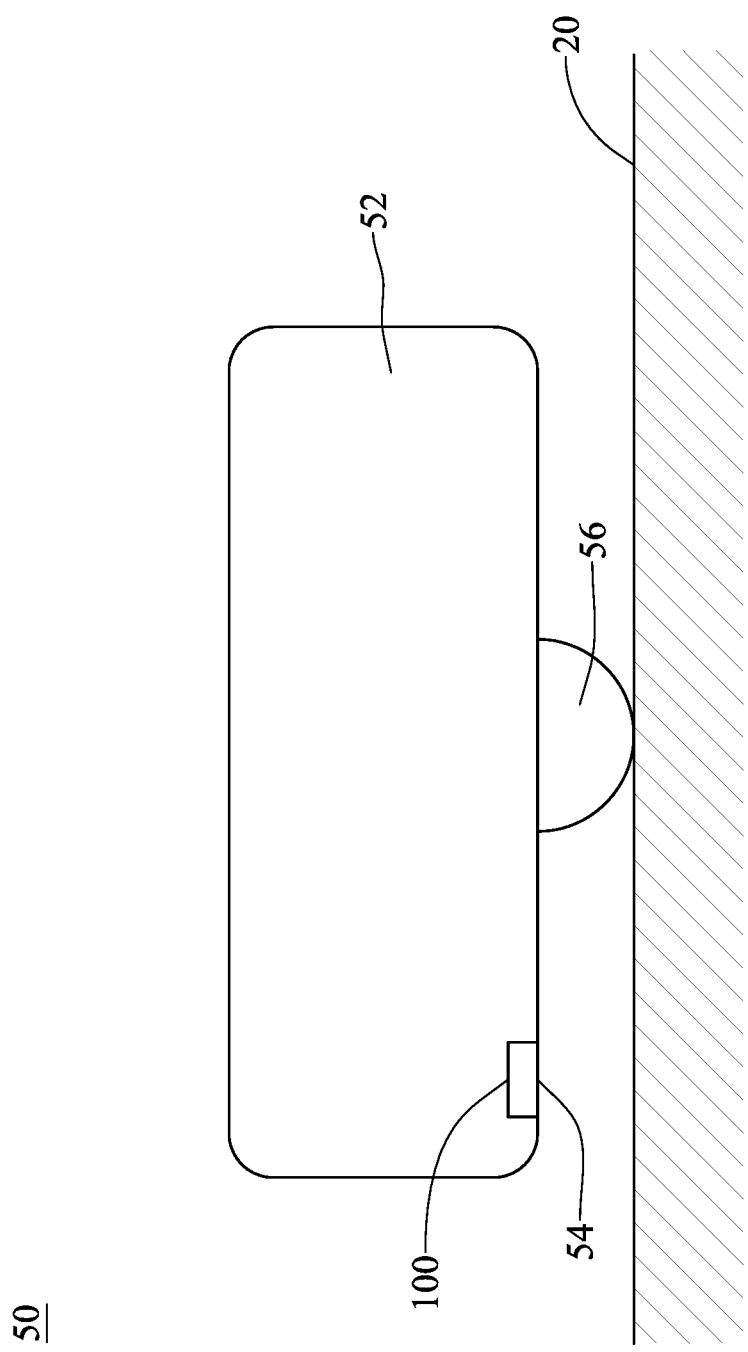
FIG. 1 is a schematic view of the self-propelled apparatus with an anti-drop system in accordance with the present invention.
Figure 2:
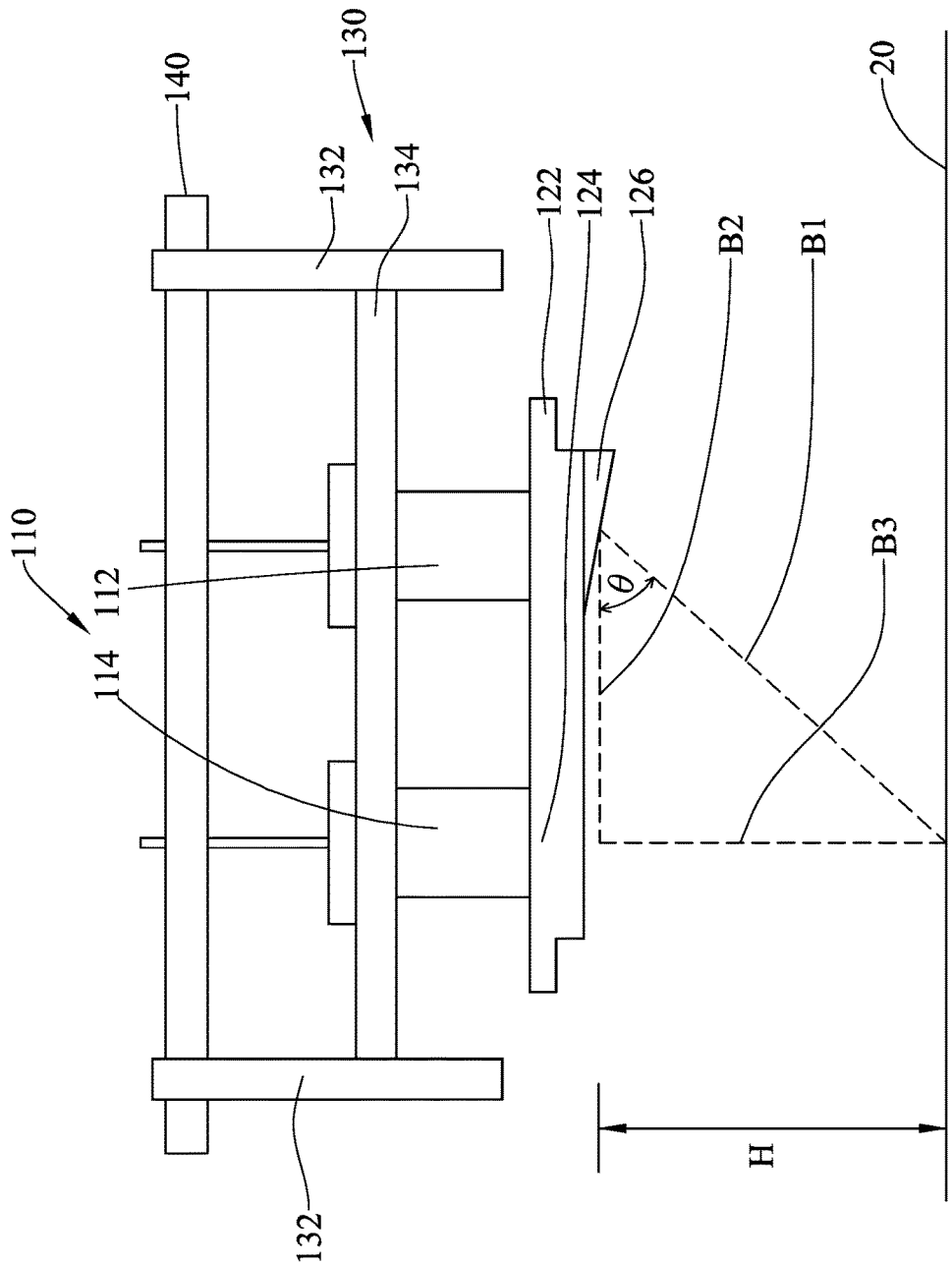
FIG. 2 demonstrates schematically an anti-drop detection system for the self-propelled apparatus of FIG. 1.

Refer now to FIG. 1 and FIG. 2, where FIG. 1 is a schematic view of the self-propelled apparatus with an anti-drop system in accordance with the present invention, and FIG. 2 demonstrates schematically an anti-drop detection system for the self-propelled apparatus of FIG. 1. A shown, in this embodiment, the self-propelled apparatus 50 includes a main body 52 and an anti-drop system 100.

The main body 52 includes an aperture 54 and at least one driving wheel 56.

The driving wheel 56 located at a bottom portion of the main body 52 is to support and the drive the main body 52.

The aperture 54 located also at the bottom portion of the main body 52 at a place in front of the driving wheel 56 is communicative with an interior of the main body 54.

The anti-drop system 100 is located inside the main body 52 at a place close to the aperture 54.

The anti-drop system 100 includes an infrared detection module 110, an angle-limiting unit 120, a fixation frame 130 and a circuit board 140.

In this embodiment, when the driving wheel 56 drives the main body 52 to waddle on the first detection surface 20, a vacuum device (not shown in the figure) is used to suck in dusts and dirt on the first detection surface 20. Simultaneously, the infrared detection module 110 is used to detect the distance between the bottom portion of the main body 52 and the first detection surface 20. In particular, the first detection surface 20 is the floor that is perpendicular to the main body 52.

Practically, the infrared detection module 110 includes an infrared emitting unit 112 and an infrared receiving unit 114.

The infrared emitting unit 112 is to emit an infrared signal to the first detection surface 20. After the infrared signal passes through the angle-limiting unit 120, a first boundary signal B1 and a second boundary signal B2 are generated.

The angle between the first boundary signal B1 and the second boundary signal B2 is represented as an angle θ. The first boundary signal B1 is to irradiate the first detection surface 20. The infrared receiving unit 114 is to receive the second boundary signal B2 and an infrared receiving signal B3, in which the infrared receiving signal B3 is the reflection signal of the first boundary signal B1 with respect to the first detection surface 20.

By providing the angle-limiting unit 120, a specific signal region is formed by the first boundary signal B1 and the second boundary signal B2. In this specific signal region, the infrared receiving signal B3 with a specific height of reflection H can be ensured to be received by the infrared receiving unit 114, such that a height-drop floor can be determined accurately within the specific height. If the height-drop floor can be precisely detected, then the performance of the anti-drop system 100 for the self-propelled apparatus 50 can be substantially enhanced. Further, by introducing the analog signal processing, the black or less-reflect-able first detection surface 20 can be still detected, and thus the practicability of the self-propelled apparatus 50 with the anti-drop system 100 can be comprehensively improved.

The infrared detection module 110 electrically couples the angle-limiting unit 120. The angle-limiting unit 120 is a lens module for adjusting and limiting the angle of the infrared signal emitted by the infrared emitting unit 112.

Practically, the angle-limiting unit 120 has a first side 122, a second side 124 opposing to the first side 122, and a protrusive portion 126.

One end of the infrared emitting unit 112 is located at the first side 122 of the angle-limiting unit 120, and one end of the infrared receiving unit 114 is located at the second side 124 of the angle-limiting unit 120.

The protrusive portion 126 is located at the first side. In this embodiment, the protrusive portion 126 is protruded from the first side 122. The infrared signal emitted by the infrared emitting unit 112 passes through the protrusive portion 126, and then reaches the first detection surface 20. Since the protrusive portion 126 provides an oblique surface, so the angle of the infrared signal emitted by the infrared emitting unit 112 would be adjusted and/or limited after passing through the protrusive portion 126.

The fixation frame 130 is to fix the infrared detection module 110, and the infrared detection module 110 is further connected to the circuit board 140.

Practically, the fixation frame 130 has two fixing members 132 and a connection member 134, in which the connection member 134 is located between the two fixing members 132, while the two fixing member 132 are planted at the circuit board 140. The infrared emitting unit 112 and the infrared receiving unit 114 are fixed between the circuit board 140 and the angle-limiting unit 120, respectively via the corresponding connection members 134.

Figure 3:
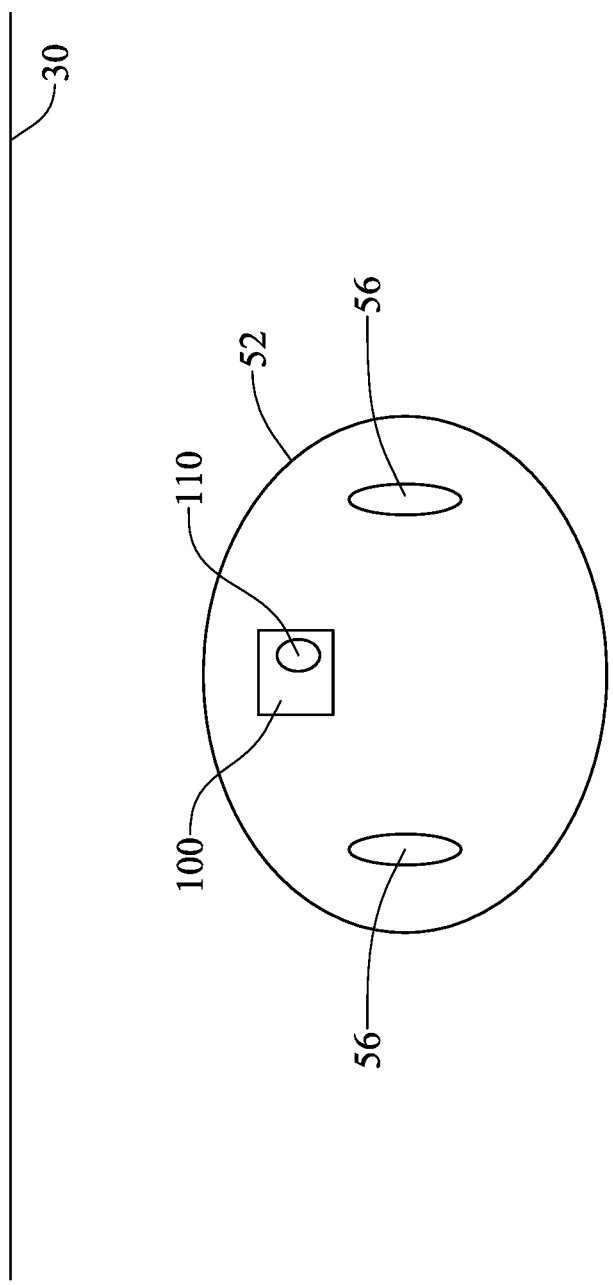
FIG. 3 shows schematically another embodiment of the self-propelled apparatus with an anti-drop system in accordance with the present invention.

Referring now to FIG. 3, another embodiment of the self-propelled apparatus with an anti-drop system is schematically shown. Referring also to FIG. 2, the infrared detection module 110 of the anti-drop system 100 is further utilized to detect the distance between the front end of the main body 52 and a second detection surface 30. In this embodiment, the second detection surface 30 is a wall. When the distance between the front end of the main body 52 and the second detection surface 30 is less or equal to a distance defined by an anti-collision region, the main body 52 is stopped so as to obtain the anti-collision purpose, or the main body 52 is slowed down. Namely, the speed of the driving wheel 56 is reduced so as to provide an anti-collision function to the main body 52.

In summary, in the self-propelled apparatus with an anti-drop system provided by the present invention, when the infrared signal passes through the angle-limiting unit, the angle-limiting unit would limit the angle of the infrared signal so as to have the infrared signal to have the first boundary signal and the second boundary signal. An angle is formed between the first boundary signal and the second boundary signal. The infrared receiving unit is to receive the infrared receiving signal that is the reflected signal of the first boundary signal by the first detection surface. Upon such an arrangement, the specific signal region defined by the first boundary signal and the second boundary signal can be formed by the angle-limiting unit, and thus a height-drop floor can be determined accurately within the specific height. Since the height-drop floor can be precisely detected, then the performance of the anti-drop system for the self-propelled apparatus can be substantially enhanced. In addition, by introducing the analog signal processing, the black or less-reflect-able first detection surface can be still detected, and thus the practicability of the self-propelled apparatus with the anti-drop system can be comprehensively improved.

While the present invention has been particularly shown and described with reference to a preferred embodiment, it will be understood by those skilled in the art that various changes in form and detail may be without departing from the spirit and scope of the present invention.

What is claimed is:

1. A self-propelled apparatus with an anti-drop system, comprising:
   a main body, including an aperture and at least one driving wheel located at a bottom portion of the main body, the aperture being located also to the bottom portion and communicative with an interior of the main body; and
   an anti-drop system, located inside the main body at a place respective to the aperture, further including an infrared detection module and an angle-limiting unit electrically coupled with the infrared detection module, the infrared detection module being to detect a distance between the bottom portion of the main body and a first detection surface, the infrared detection module further including an infrared emitting unit and an infrared receiving unit, the infrared emitting unit being to emit an infrared signal to the first detection surface, the infrared signal producing a first boundary signal and a second boundary signal after the infrared signal passes through the angle-limiting unit, an angle being formed by the first boundary signal and the second boundary signal, the infrared receiving unit being to receive an infrared receiving signal that is the reflected signal of the first boundary signal by the first detection surface.

2. The self-propelled apparatus with an anti-drop system of claim 1, wherein the angle-limiting unit further has a first side, a second side opposing to the first side, and a protrusive portion, one end of the infrared emitting unit being located at the first side, another end of the infrared receiving unit being located at the second side, the protrusive portion being located at the first side, the infrared signal emitted by the infrared emitting unit being to pass through the protrusive portion and then to reach the first detection surface.

3. The self-propelled apparatus with an anti-drop system of claim 1, wherein the angle-limiting unit is a lens module.

4. The self-propelled apparatus with an anti-drop system of claim 1, wherein the anti-drop system further includes a fixation frame for fixing the infrared detection module.

5. The self-propelled apparatus with an anti-drop system of claim 1, wherein the anti-drop system further includes a circuit board electrically coupled with the infrared detection module.

6. The self-propelled apparatus with an anti-drop system of claim 1, wherein the first boundary signal is to irradiate the first detection surface, and the infrared receiving unit is to receive the second boundary signal.

7. The self-propelled apparatus with an anti-drop system of claim 1, wherein the infrared detection module is further to detect a distance between a front end of the main body and a second detection surface, and the main body is stopped or slowed down when the distance between the front end of the main body and the second detection surface is less or equal to another distance defined by an anti-collision region.

* * * * *